Sept. 23, 1924.  E. D. MYERS  1,509,368
SPEEDOMETER DRIVE MEANS
Filed Nov. 26, 1921
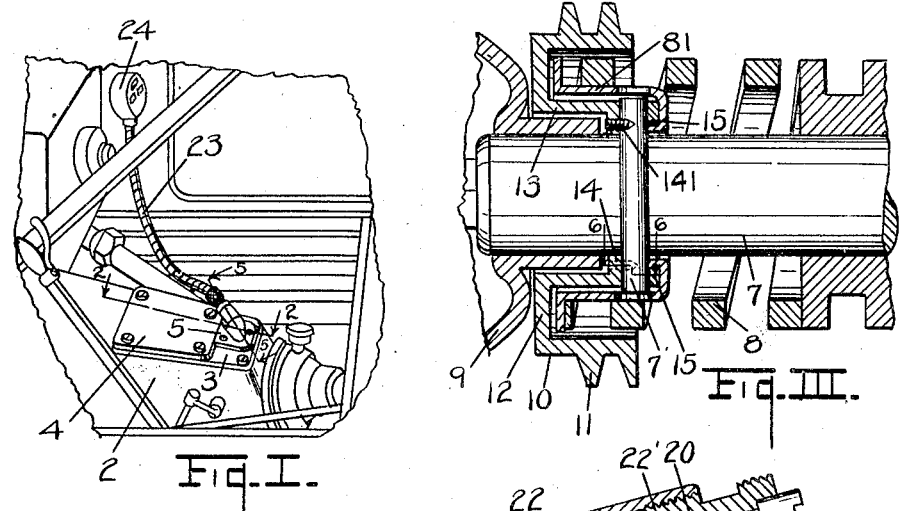
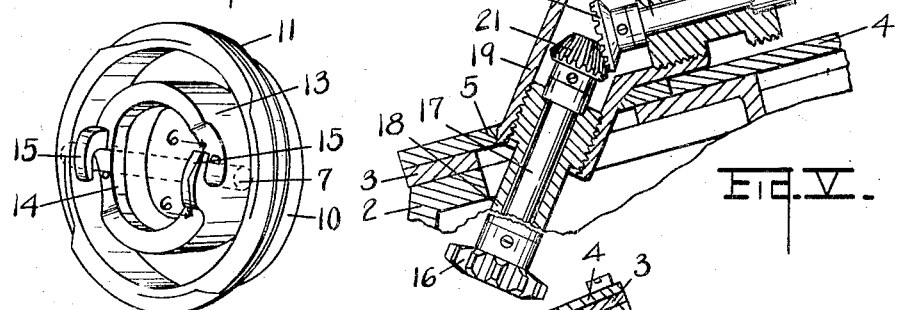
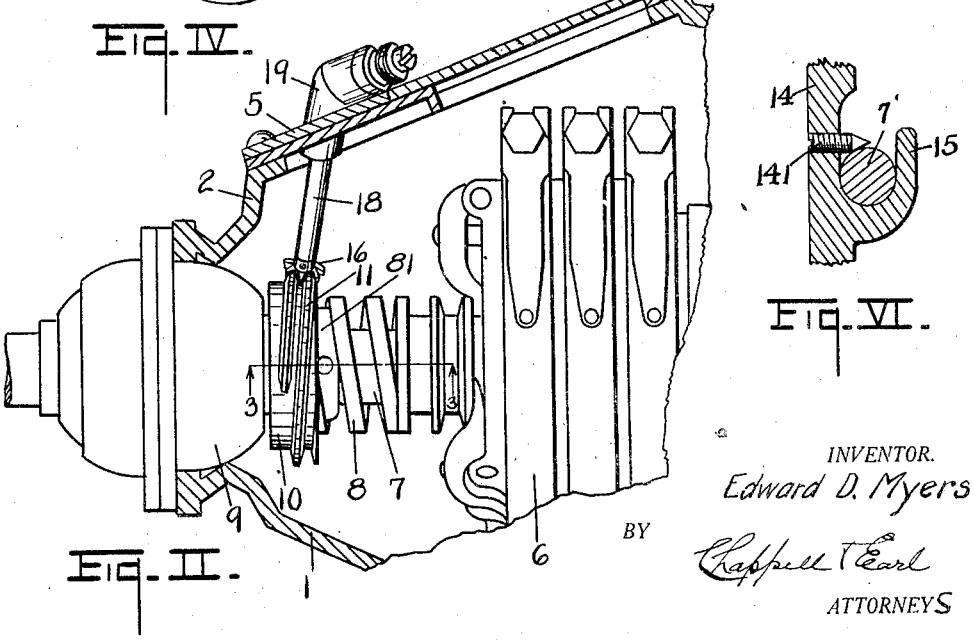
INVENTOR.
Edward D. Myers
BY
Chappell & Earl
ATTORNEYS Patented Sept. 23, 1924.

1,509,368

UNITED STATES PATENT OFFICE.

EDWARD D. MYERS, OF SHELBY, MICHIGAN.

SPEEDOMETER-DRIVE MEANS.

Application filed November 26, 1921. Serial No. 517,888.

*To all whom it may concern:*

Be it known that I, EDWARD D. MYERS, a citizen of the United States, residing at Shelby, county of Oceana, State of Michigan, have invented certain new and useful Improvements in Speedometer-Drive Means, of which the following is a specification.

This invention relates to improvements in speedometer drive means.

The objects of the invention are:

First, to provide a simple and effective drive for a speedometer shaft to be driven from the driving gear of a Ford automobile, applicable to a finished car.

Second, to provide an improved attachment worm for such purpose.

Third, to provide an improved construction and arrangement of worm gear attachment.

Objects pertaining to details and economies of construction and operation will definitely appear from the detailed description to follow.

I accomplish the objects of the invention by the devices and means described in the following specification. The invention is clearly defined and pointed out in the claims.

A structure which is a preferred embodiment of the invention is fully illustrated in the accompanying drawing, forming a part of this application, in which:

Fig. I is a detail perspective view of portions of a Ford automobile with the floor boards removed, showing my improved speedometer driving means in place.

Fig. II is an enlarged detail vertical longitudinal section of the transmission of a Ford automobile taken on a line corresponding to line 2—2 of Fig. I, portions being shown in full lines and the parts of my speedometer drive being shown in full lines.

Fig. III is an enlarged detail longitudinal sectional plan view taken on a line corresponding to line 3—3 of Fig. II.

Fig. IV is an enlarged detail perspective view of my improved detachable worm, the cross pin with which it is in engagement being indicated by dotted lines.

Fig. V is an enlarged detail sectional view on a line corresponding to line 5—5 of Fig. I, showing the angular bevel gear connection from the worm gear shaft to the flexible shaft of the speedometer.

Fig. VI is an enlarged detail sectional view on an irregular line 6—6 of Figs. III and IV showing the set-screw retaining means for the worm.

In the drawing the sectional views are taken looking in the direction of the little arrows at the ends of the section lines and similar numerals of reference refer to similar parts throughout the several views.

I will consider the numbered parts of the drawing by their numbers: 1 is the transmission casing. 2 is the transmission case cover. 3 is the transmission case cover door. 4 is an auxiliary transmission case cover door fitted to cover a hand hole in the cover door 3. 5 is a detachable plate carrying the driven shaft of the speedometer drive. 6 is the planetary transmission. 7 is the propeller shaft. 8 is the clutch spring, and 81 is the clutch spring support. 7' is the cross-pin for holding said clutch spring support in place. 9 is the universal joint casing. 10 is my improved worm attachment device, which has worm 11 on its periphery. A disk-like portion 12 carries a shell-like hub 13 which embraces the forward end of the universal joint casing. A flange 14 is provided on the hub which snugly embraces the propeller shaft 7. Oppositely disposed engaging hooks 15 are carried at the forward end of the hub and embrace the projecting ends of the cross-pin 7'. The spring support 81 is forced forward sufficiently to receive these projecting hooks, which constitute a bayonet joint, the hooks of which are forced rearwardly against the ends of the pin by the action of the clutch spring against its support, as clearly appears from an examination of Figs. III and IV.

A set-screw 141 is inserted through the flange 14 and engages the cross-pin 7' and prevents the disengagement of the hook 15 as is readily seen from the detail view Fig. VI.

16 is the worm gear carried on the end of the shaft 17, which shaft is supported in an elongated bearing 18, which is screw threaded into a housing 19, which housing is carried by the detachable plate 5. The upper end of the shaft 17 is provided with a bevel gear 21 meshing with bevel gear 22, which is carried on shaft 22' in the screw-threaded bearing 20 in the upper end of the said housing 19. This speedometer shaft 17 is disposed in oblique relation to the propeller shaft 7, as will be seen from an inspection of Figs. I and II. The flexible shaft 23 extends from the drive means to the speedometer 24.

Having thus described my invention, what I claim as new and desire to secure by Letters Patent, is:

1. In a speedometer drive, the combination of the transmission with the propeller shaft and a suitable casing, a clutch spring support with a shell-like hub with a cross-pin within the same, a worm gear disposed on said shaft having a hollow hub disposed within the said hub of said clutch spring support and having an inwardly projecting flange closely engaging the propeller shaft and having oppositely disposed bayonet joint hooks to engage the projecting ends of the said cross-pin, set-screws through the said flange engaging the said cross pin to prevent disengagement, a false door for the transmission casing cover with a bearing housing carried thereby, a speedometer shaft disposed obliquely therein having an elongated bearing projecting within the casing, a bevel gear at its upper end, and a worm gear at the lower end of said shaft meshing with the said worm, coacting as specified.

2. In a speedometer drive, the combination of the transmission with propeller shaft and a suitable casing, a clutch spring support with a shell-like hub with a cross-pin within the same, a worm gear disposed on said shaft having a hollow hub disposed within the hub of said clutch spring support and having an inwardly projecting flange closely engaging the propeller shaft and having oppositely disposed bayonet joint hooks to engage the projecting ends of the said cross-pin, set-screws through the said flange engaging the said cross pin to prevent disengagement, and a speedometer shaft with worm gear disposed to be driven by said worm, as specified.

3. In a speedometer drive, the combination of the transmission with propeller shaft and a suitable casing, a clutch spring support with a shell-like hub with a cross-pin within the same, a worm gear disposed on said shaft having a hollow hub disposed within the hub of said clutch spring support and having an inwardly projecting flange closely engaging the propeller shaft and having oppositely disposed bayonet joint hooks to engage the projecting ends of the said cross-pin, and a speedometer shaft with worm gear disposed to be driven by said worm, as specified.

4. In a speedometer drive structure, the combination with a clutch spring support with a shell-like hub and cross-pin therein, of a worm gear having a hub disposed within the hub of said clutch spring and having a bayonet hook to engage said cross-pin, as specified.

In witness whereof, I have hereunto set my hand and seal.

EDWARD D. MYERS. [L. S.]